United States Patent

Wier et al.

[11] Patent Number: 5,647,205
[45] Date of Patent: Jul. 15, 1997

[54] PROCESS FOR CHECKING THE CONVERSION CAPABILITY OF A CATALYST

[75] Inventors: Manfred Wier, Wenzenbach; Stefan Treinies; Alexander Ketterer, both of Regensburg, all of Germany

[73] Assignee: Siemens Aktiengesellschaft, Munich, Germany

[21] Appl. No.: 530,209

[22] PCT Filed: Mar. 1, 1994

[86] PCT No.: PCT/DE94/00219

§ 371 Date: Sep. 19, 1995

§ 102(e) Date: Sep. 19, 1995

[87] PCT Pub. No.: WO94/21901

PCT Pub. Date: Sep. 29, 1994

[30] Foreign Application Priority Data

Mar. 19, 1993 [DE] Germany .......... 43 08 894.5

[51] Int. Cl.$^6$ .................................. F01N 3/00
[52] U.S. Cl. ............................. 60/274; 60/299
[58] Field of Search .............. 60/277, 274, 284, 60/299

[56] References Cited

U.S. PATENT DOCUMENTS

| | | | |
|---|---|---|---|
| 5,307,626 | 5/1994 | Maus et al. | 60/277 |
| 5,319,921 | 6/1994 | Gopp | 60/277 |
| 5,339,627 | 8/1994 | Baier | 60/277 |
| 5,390,491 | 2/1995 | Suzumura et al. | 60/277 |
| 5,417,061 | 5/1995 | Maeda et al. | 60/277 |
| 5,509,267 | 4/1996 | Theis | 60/274 |
| 5,526,643 | 6/1996 | Mukaihira et al. | 60/277 |

FOREIGN PATENT DOCUMENTS

| | | | |
|---|---|---|---|
| 2643739 | 3/1986 | Germany . | |
| 4100397 | 8/1991 | Germany . | |
| 4122787 | 1/1992 | Germany . | |
| 114839 | 9/1980 | Japan | 60/277 |
| 1373826 | 11/1974 | United Kingdom . | |

Primary Examiner—John T. Kwon
Attorney, Agent, or Firm—Herbert L. Lerner; Laurence A. Greenberg

[57] ABSTRACT

The invention relates, in particular, to the checking of the conversion of a precatalyzer associated with internal combustion engines. The checking being carried out during the overrunning of the motor vehicle given a sufficiently long idling phase. The following criteria being evaluated singly or in combination to determine if the catalyzer is operative. The first criteria checked is the difference between the temperature downstream and upstream of the catalyzer (FIG. 2). The second criteria checked is if the temperature downstream of the catalyzer is in a predetermined range (FIG. 3). The third criteria checked is if the temperature downstream and upstream of the catalyzer exhibits a minimum difference (FIG. 4). The fourth criteria checked is if the magnitude of the temperature gradient for the temperature upstream of the catalyzer is significantly greater than the magnitude of the temperature gradient of the temperature downstream from the catalyzer.

7 Claims, 4 Drawing Sheets

PROCESS FOR CHECKING THE CONVERSION CAPABILITY OF A CATALYST

BACKGROUND OF THE INVENTION

Field of the Invention

The present invention relates to a method for checking the conversion capability of a catalyzer in accordance with the precharacterizing clause of patent claim 1.

To convert noxious components in exhaust gases of internal combustion engines, use is made of catalyzers which convert the hydrocarbons, carbon monoxide and nitrogen oxide contained in the exhaust gases into compounds which are harmless in terms of their effect on health. In operation, the catalyzers are exposed to severe conditions such as high temperatures and vibration and their life is thus limited. This can lead, during the life of a motor vehicle, to a reduction in the conversion efficiency of the catalyzer, necessitating replacement of the catalyzer.

However, since the legal requirements relating to exhaust gases must be met at all times during the entire period of use, it is necessary to monitor the function of the catalyzer. The monitoring system can here indicate to the driver when the catalyzer is no longer operating satisfactorily by means of an optical or acoustic signal.

German Patent 2,643,739 has disclosed a method for monitoring the activity of catalyzers for exhaust gas purification in which two temperature detectors are provided. One temperature detector is arranged in the catalyzer and the other is arranged just upstream of the catalyzer. This known method exploits the fact that, when the catalyzer is working properly, there is a temperature increase within the system owing to exothermic reactions in the catalyzer and the catalytic effect measured at the catalyzer is a measure of the operation of the catalyzer.

German published, non-prosecuted application 4,100,397 has furthermore disclosed a method and an arrangement for monitoring the conversion efficiency of a catalyzer in which the difference between the temperatures upstream and downstream of the catalyzer which occur in an overrun phase of the internal combustion engine when an ignition failure is produced and a predetermined quantity of fuel/air mixture is supplied is detected and evaluated.

It is the object of the present invention to present a method for checking or monitoring the conversion capability of a catalyzer in which checking or monitoring of the operation of the catalyzer is possible without interfering with the catalyzer.

SUMMARY OF THE INVENTION

This object is achieved according to the invention by means of patent claim 1. Advantageous developments are characterized in the subclaims.

If the exhaust system for an internal combustion engine comprises, for example, a separate precatalyzer and main catalyzer, then to monitor the operating capability of the precatalyzer use can be made of the characteristic that, due to its mass and coating, the precatalyzer is configured in such way that it has a high conversion rate at operating points with low mass flow rates. At these operating points, this leads to a large rise in the temperature characteristic across the catalyzer. If, however, the catalyzer has only an inadequate conversion capability or none at all, the temperature upstream of the catalyzer and that downstream of it are virtually the same, so that it can be concluded that the catalyzer is operating inadequately, if at all.

Owing to the transition from an operating point with a relatively high load and engine speed, via an overrun phase (cooling by oxygen), to an idling phase (an operating point with a low load and engine speed), there is a fundamental drop in the exhaust-gas temperature. The catalyzer has a certain storage effect as regards the temperature and conversion, with the result that this drop in the temperature is measured with a certain time delay downstream of the catalyzer.

The difference in the temperature characteristic of the good catalyzer and a defective catalyzer is only very small. A significant difference can only be detected at the beginning of an idling phase which follows on directly from an overrun phase with the injection switched off, since here there is a strongly exothermic reaction when injection recommences due to the oxygen supplied in the overrun phase. Owing to the smallness of the difference, the conditions prevailing before and during the individual measurement should furthermore be stable and identical in every case. Extremely reliable criteria for assessing the conversion capability of a catalyzer can be obtained if in each case a plurality of measurements are taken in a predetermined time interval and used to form an average, which is then compared with a limiting value.

The method can be applied with particular advantage to the first catalyzer in the exhaust duct of a motor vehicle, which can be a precatalyzer since, as tests have shown, particularly reliable measurement results can be obtained by means of the method according to the invention in the case of a catalyzer which does not exceed a certain size, since the catalyzer then converts at a particularly high rate.

The invention will now be explained in greater detail with reference to seven figures, a precatalyzer having been selected as the catalyzer to be checked.

DESCRIPTION OF THE PREFERRED EMBODIMENT

The individual criteria for checking the operating capability of a catalyzer, which is here, for example, a precatalyzer, will now be explained with reference to graphical representations (FIG. 1 to 6). A subsequent Figure, FIG. 7, shows the arrangement of a precatalyzer and a main catalyzer in the exhaust duct of an internal combustion engine.

Figure 6:
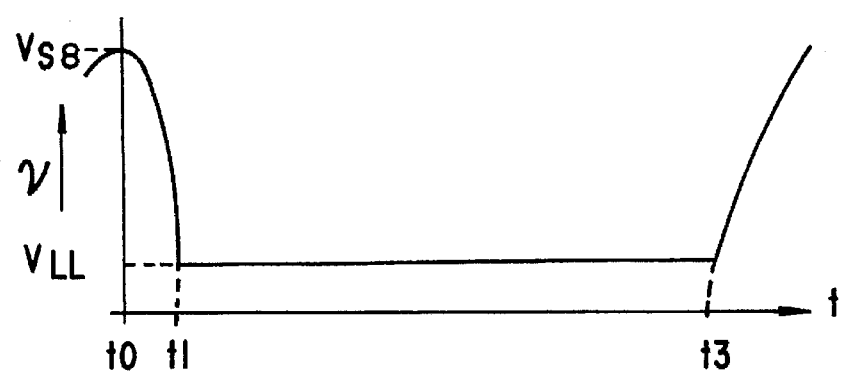
FIG. 6 shows a characteristic of the vehicle speed against time.
Figure 7:
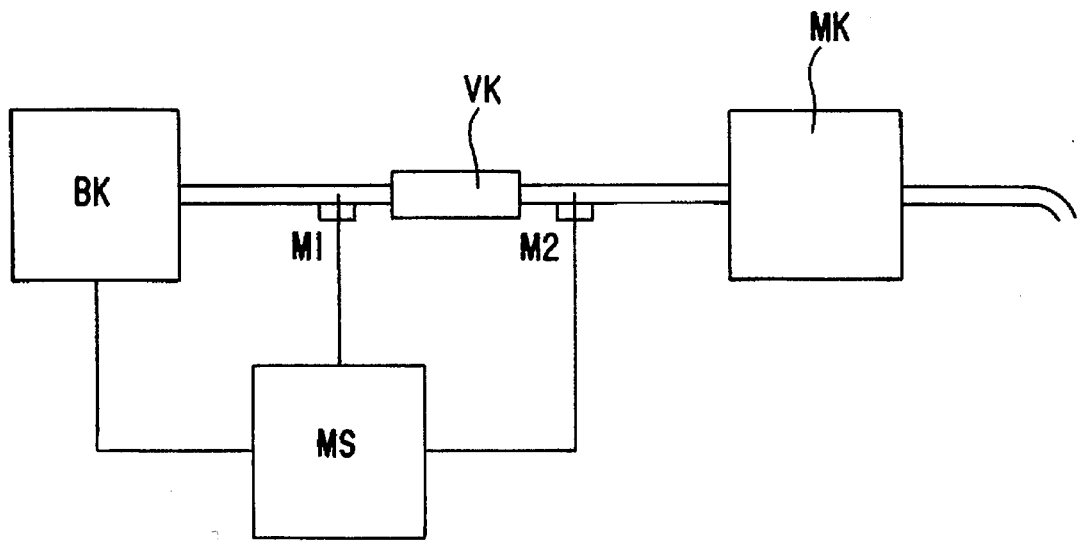
FIG. 7 shows, schematically, an internal combustion engine with an exhaust duct.

FIG. 6 shows the speed v of a vehicle against time. At time t0, the speed is $v_{SB}$, this being intended to indicate the beginning of overrun operation. At time t1, the vehicle is idling, after concluding the overrun phase, at a speed $v_{LL}$, which should continue until time t3. It is during this period between t1 and t3 that the catalyzer should be checked.

Figure 1:
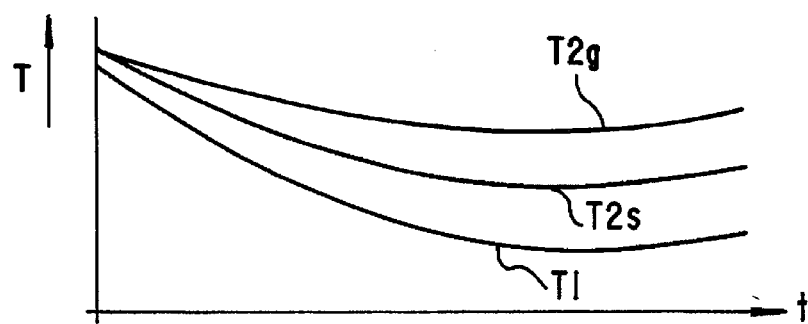
FIG. 1 shows the temperature characteristic upstream and downstream of the catalyzer against time during an overrun and idling phase.

Depending on this speed characteristic, which occurs frequently in vehicle operation, the precatalyzer is now checked. The curves illustrated in FIG. 1 show the relevant temperature characteristic T1 upstream of the precatalyzer, T2g shows the temperature characteristic for a good precatalyzer which is working properly and T2s shows that for a spent precatalyzer, T2 being the temperature which is measured downstream of the precatalyzer. From these it can be seen that, when the precatalyzer is working properly, the temperature difference $\Delta T=T2g-T1$ is greater than in the case of a spent precatalyzer.

Figure 2:
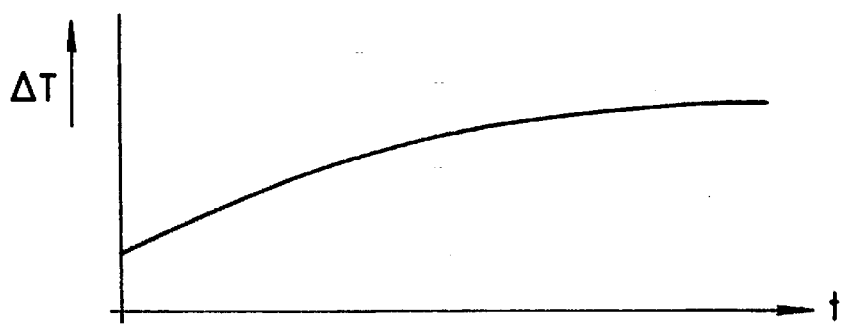
FIG. 2 shows the characteristic of the temperature difference against time.

FIG. 2 shows the characteristic of the temperature difference $\Delta T$ in the case of a precatalyzer which is working properly, it being possible for the values to be compared with predetermined values stored in a computer or an engine controller in order to assess the operating capability of the precatalyzer.

Figure 3:
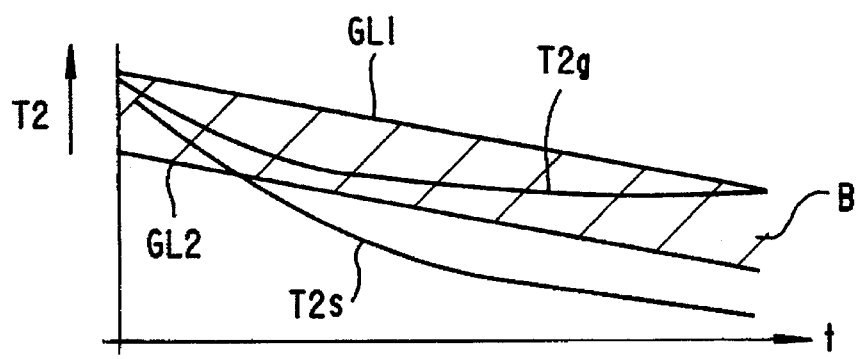
FIG. 3 shows the permissible range against time.

In FIG. 3, the temperature T2 is plotted against time t. A range B between two limit lines GL1, GL2 is furthermore shown. If the measured values T2g for T2 lie within this range B, the precatalyzer is working properly. If, on the other hand, the measured values for T2 (curve T2s) leave the range B, the precatalyzer is defective.

Figure 4:
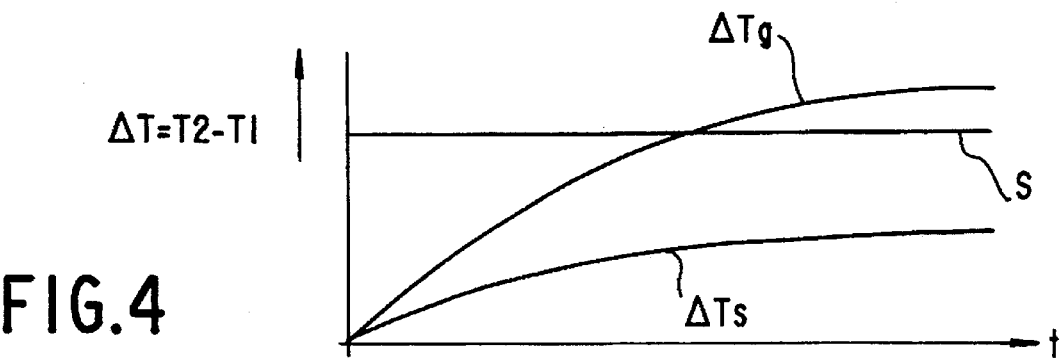
FIG. 4 shows a limiting range for the temperature difference upstream and downstream of the catalyzer against time.

A further possibility for checking the precatalyzer is to evaluate the temperature difference $\Delta T=T2-T1$ by specifying a certain threshold S (FIG. 4). If the temperature difference $\Delta Tg$ exceeds the threshold S in the checking phase, the precatalyzer is recognized to be working properly. If the value for the temperature difference $\Delta Ts$ is below this threshold S, the precatalyzer is defective.

Figure 5:
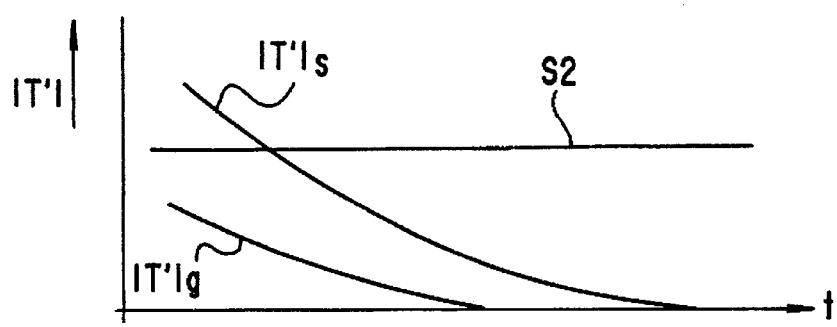
FIG. 5 shows the magnitude of the temperature gradient against time.

The curves illustrated in FIG. 5 show the magnitude of the temperature gradient [Ṫ] of the temperature downstream of the catalyzer against time. The curve [Ṫ] g shows the characteristic of the temperature against time for a good precatalyzer which is working properly while the curve [Ṫ] s shows the characteristic for a spent catalyzer. Owing to the reduced mass flow rate of the exhaust gas in the overrun and idling phase, the temperature upstream of the precatalyzer falls. Since a spent catalyzer has only poor residual conversion properties, the temperature downstream of the precatalyzer corresponds almost to the temperature upstream of the precatalyzer, i.e. it drops with equal rapidity. In a catalyzer which is converting efficiently, on the other hand, vigorous exothermic reactions take place in the checking period, as a result of which the temperature drop downstream of the precatalyzer is only small. If the magnitude of the temperature gradient downstream of the catalyzer within the checking period is above a threshold S2 stored in an engine control unit, the system detects that the precatalyzer is spent.

FIG. 7 shows, schematically, the arrangement of the exhaust purification system and an internal combustion engine. The internal combustion engine BK has in its exhaust duct a precatalyzer VK and an adjoining main catalyzer HK. Also indicated is an engine controller MS, to which the measuring points M1, M2 upstream and downstream of the precatalyzer are connected.

In certain cases, it may be possible to dispense with measuring point M1 if the temperature characteristic upstream of the precatalyzer is calculated in a computer with the aid of an exhaust-gas temperature model with the engine speed and load as input variables.

Checking is generally carried out once per engine run.

The curves illustrated in FIG. 5 show the magnitude of the temperature gradient [Ṫ] against time. The curve [Ṫ] g shows the characteristic of the temperature against time for a good precatalyzer which is working properly while the curve [Ṫ] s shows the characteristic for a spent catalyzer. Owing to the reduced mass flow rate of the exhaust gas in the overrun and idling phase, the precatalyzer temperature falls. Since a spent catalyzer has only poor residual conversion properties, the temperature downstream of the precatalyzer corresponds almost to the temperature upstream of the precatalyzer. In a catalyzer which is converting efficiently, vigorous exothermic reactions take place in the checking period, as a result of which the temperature drop downstream of the precatalyzer is only small. If the magnitude of the temperature gradient within the checking period is above a threshold S2 stored in an engine control unit, the system detects that the precatalyzer is spent.

FIG. 7 shows, schematically, the arrangement of the exhaust purification system and an internal combustion engine. The internal combustion engine BK has in its exhaust duct a precatalyzer VK and an adjoining main catalyzer HK. Also indicated is an engine controller MS, to which the measuring points M1, M2 upstream and downstream of the precatalyzer are connected.

In certain cases, it may be possible to dispense with measuring point M1 if the temperature characteristic upstream of the precatalyzer is calculated in a computer with the aid of an exhaust-gas temperature model with the engine speed and load as input variables.

Figure 8:
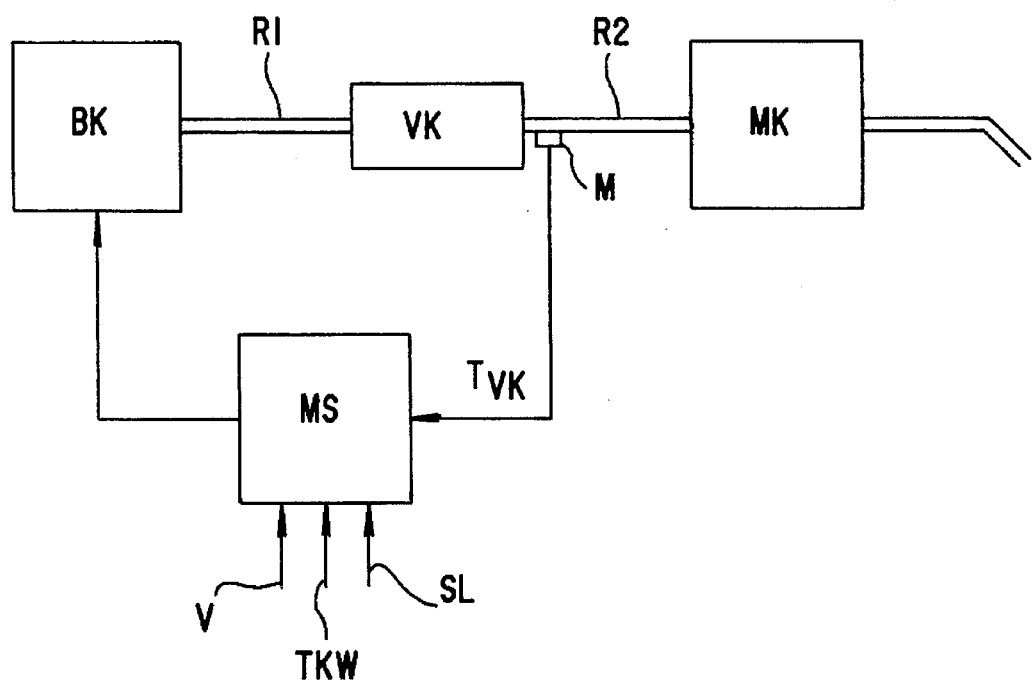
FIG. 8 shows, schematically a further internal combustion engine with an exhaust duct.

FIG. 8 shows, schematically, an internal combustion engine BK, which is connected by a first exhaust pipe R1 to a precatalyzer VK and then by a second exhaust pipe R2 to a main catalyzer HK. Provided immediately downstream of the precatalyzer VK is a measuring point M, via which the exhaust-gas temperature downstream of the precatalyzer can be measured. The measured value measured at this point, together with other measured values, is supplied for evaluation to a computer such as an engine controller MS, in which predetermined procedures are carried out.

Figure 9:
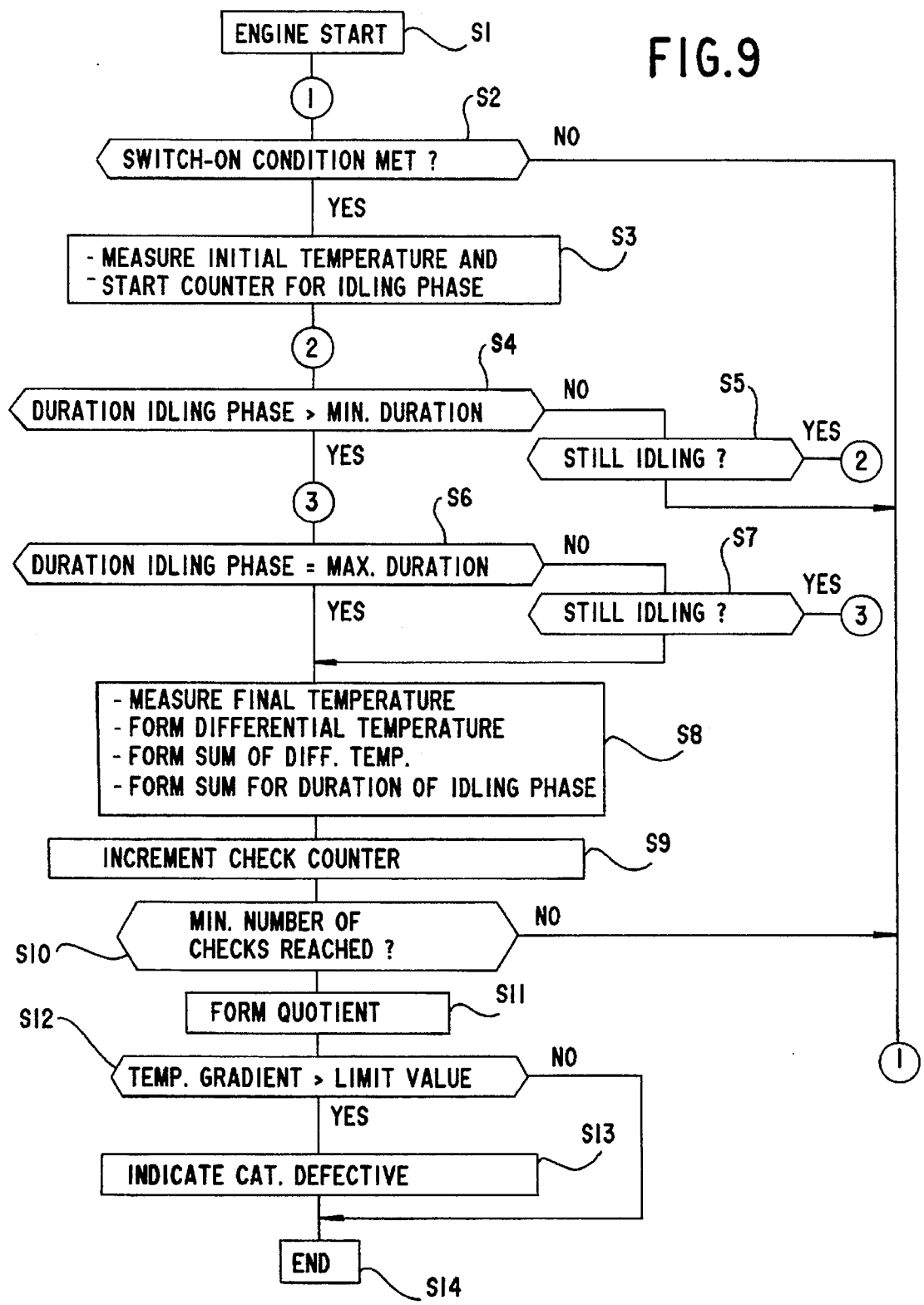
FIG. 9 is a flowchart describing the process according to the invention.

In the flow diagram shown in FIG. 9, the internal combustion engine is started in a first step S1. In a following step S2, the system checks whether the switch-on conditions for checking the catalyzer have been met. These include the following operating conditions: whether the lambda closed-loop control is active, secondary-air operation is inactive, the operating temperature of the internal combustion engine has been reached, the travelling speed of the motor vehicle is within a predetermined range and whether the conditions of steady-state operation before entry into the overrun phase have been met. If this is not the case, the routine returns to 1. If the switch-on conditions have been met, the routine progresses to a step S3, where the temperature (initial temperature) at the beginning of the idling phase (LL phase) following overrun operation is measured. At the same time, a counter for the duration of the idling phase is started. In a following step S4, a decision is made as to whether the duration of the idling phase is longer than a minimum duration. If the decision is "No", the routine progresses to a step S5, where the system checks whether the condition for idling is still met. If the decision is "Yes", the routine returns to 2. If the decision is "No", the routine returns to the beginning of the routine, i.e. to 1. If the duration of the idling phase is greater than the minimum duration, the routine progresses to a decision step S6, where a decision is made as to whether the duration of the idling phase is equal to the maximum duration. If the decision at S6 is "No", the routine progresses to a step S7, where a decision is taken as to whether the condition for idling is still met. If the decision at S7 is "Yes", the routine returns to 3. If the decision is "No", the routine progresses to a step S8.

If the decision at S6 is "Yes", the routine progresses immediately from S6 to a step S8. In this step S8, the temperature at the end of the idling phase is measured. The difference between the final temperature and the initial temperature is furthermore determined and all the differences added. In this step, the total duration of all the idling phases is determined. In step S9, a check counter is incremented. In the following step S10, a decision is taken as to whether the minimum number of checks has been reached. If this is not the case, the routine returns to 1. If the minimum number of checks has been reached, the quotient of the total of the measurement results for the differential temperature and the total duration of the measurements is formed in order to obtain a resulting temperature gradient. In the following step S12, a decision is made as to whether the resulting temperature gradient is greater than a limiting value. If the decision is "Yes", the catalyzer is defective or no longer meets its minimum requirements, this being indicated in a Step S13. If the decision is "No", the routine progresses to an end step S14.

Checking is generally carried out once per engine

We claim:

1. A method for checking a conversion of a catalytic converter of a motor vehicle, which comprises:
   providing an internal combustion engine;
   providing an exhaust system having a catalytic converter, the exhaust system being connected to the internal combustion engine;
   overrunning the internal combustion engine;
   subsequently idling the internal combustion engine for a sufficiently long period;
   performing the following verification steps:
   a) measuring a temperature upstream of the catalytic converter in exhaust gas flow direction, measuring a temperature downstream from the catalytic converter, determining a difference between the upstream temperature and the downstream temperature, and verifying that the difference is greater than a predetermined reference value;
   b) monitoring the temperature downstream of the catalytic converter and verifying that it remains within a predetermined range beginning with a measurement following a beginning of the monitoring step and during the entire monitoring step;
   c) verifying that a magnitude of a gradient of the temperature downstream of the catalytic converter is smaller than a magnitude of a gradient of the temperature upstream of the catalytic converter; and
   d) verifying that the magnitude of the gradient of the temperature downstream of the catalytic converter lies below a predetermined threshold value (S2); and
   determining the catalytic converter to be operative upon one of the verification steps being satisfied.

2. The method according to claim 1, which comprises calculating the temperature upstream of the catalytic converter in criteria a) and c) with a computer with the aid of an exhaust-gas temperature model and using engine speed and load as input variables.

3. The method according to claim 1, wherein the temperature upstream of the catalytic converter in criteria a) and c) is measured with a sensor at a location upstream of the catalytic converter.

4. A method for checking a conversion of a catalytic converter of a motor vehicle, which comprises:
   providing an internal combustion engine;
   providing an exhaust system having a catalytic converter, the exhaust system being connected to the internal combustion engine;
   overrunning the internal combustion engine;
   subsequently idling the internal combustion engine for a sufficiently long period;
   measuring a temperature upstream of the catalytic converter as seen in exhaust gag flow direction, measuring a temperature downstream from the catalytic converter, determining a difference between the upstream temperature and the downstream temperature, and verifying that the difference is greater than a predetermined reference value and
   determining the catalytic converter to a operative upon the verification step being satisfied.

5. A method for checking a conversion of a catalytic converter of a motor vehicle, which comprises:
   providing an internal combustion engine;
   providing an exhaust system having a catalytic converter, the exhaust system being connected to the internal combustion engine;
   overrunning the internal combustion engine;
   subsequently idling the internal combustion engine for a sufficiently long period;
   monitoring the temperature downstream of the catalytic converter and verifying that it remains within a predetermined range beginning with a measurement following a beginning of the monitoring step and during the entire monitoring step; and
   determining the catalytic converter to be operative upon the verification step being satisfied.

6. A method for checking a conversion of a catalytic converter of a motor vehicle, which comprises:
   providing an internal combustion engine;
   providing an exhaust system having a catalytic converter, the exhaust system being connected to the internal combustion engine;
   overrunning the internal combustion engine;
   subsequently idling the internal combustion engine for a sufficiently long period;
   monitoring the temperature downstream of the catalytic converter;

verifying that the magnitude the gradient of the temperature downstream of the catalytic converter lies below a predetermined threshold value (S2); and determining the catalytic converter to be operative upon the verification step being satisfied.

7. A method for checking a conversion of a catalytic converter of a motor vehicle, which comprises:

providing an internal combustion engine;

providing an exhaust system having a catalytic converter, the exhaust system being connected to the internal combustion engine;

overrunning the internal combustion engine;

subsequently idling the internal combustion engine for a sufficiently long period;

monitoring the temperature downstream of the catalytic converter and monitoring the temperature upstream of the catalytic converter;

verifying that a magnitude of a gradient of the temperature downstream of the catalytic converter is smaller than a magnitude of a gradient of the temperature upstream of the catalytic converter; and determining the catalytic converter to be operative upon the verification step being satisfied.

* * * * *